US010353207B2

United States Patent
Maruyama et al.

(10) Patent No.: US 10,353,207 B2
(45) Date of Patent: Jul. 16, 2019

(54) HEAD-MOUNTED DISPLAY DEVICE AND VIDEO DISPLAY SYSTEM

(71) Applicant: Sony Interactive Entertainment Inc., Tokyo (JP)

(72) Inventors: Takao Maruyama, Kanagawa (JP); Yoshinori Ohashi, Tokyo (JP); Koichi Shiono, Kanagawa (JP); Yoichi Nishimaki, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 57 days.

(21) Appl. No.: 15/531,833

(22) PCT Filed: Sep. 24, 2015

(86) PCT No.: PCT/JP2015/076932
§ 371 (c)(1),
(2) Date: May 31, 2017

(87) PCT Pub. No.: WO2016/098412
PCT Pub. Date: Jun. 23, 2016

(65) Prior Publication Data
US 2017/0315367 A1    Nov. 2, 2017

(30) Foreign Application Priority Data
Dec. 19, 2014 (JP) .................................. 2014-257754

(51) Int. Cl.
*G02B 26/08* (2006.01)
*G02B 26/10* (2006.01)
(Continued)

(52) U.S. Cl.
CPC ..... *G02B 27/0179* (2013.01); *G02B 27/0172* (2013.01); *G02B 27/0176* (2013.01);
(Continued)

(58) Field of Classification Search
CPC ........ G02B 2027/0185; G02B 27/0172; G02B 27/0179; G02B 2027/0134;
(Continued)

(56) References Cited

U.S. PATENT DOCUMENTS

2012/0113092 A1* 5/2012 Bar-Zeev ............. G02B 27/017
345/419

FOREIGN PATENT DOCUMENTS

| JP | 2010139901 A | 6/2010 |
| JP | 2012194501 A | 10/2012 |

(Continued)

OTHER PUBLICATIONS

Office Action for corresponding JP Application No. 2016-564708, 9 pages, dated Sep. 26, 2017.
(Continued)

*Primary Examiner* — Brandi N Thomas
(74) *Attorney, Agent, or Firm* — Matthew B. Dernier, Esq.

(57) ABSTRACT

There is provided a head-mounted display device capable of adjusting a distance to an image forming position that includes video display elements that show a video, optical elements arranged in front of user's eyes to cause the video shown by the video display elements to be incident on the user's eyes, and a control mechanism that changes an optical distance between the video display elements and the optical elements. Also provided is a video display system that includes the head-mounted display device and a video supply device that includes a video supply section that supplies a video to the head-mounted display device and an image forming distance control section that outputs a control instruction to change a distance from the optical elements to the image forming position by operating the control mechanism.

6 Claims, 9 Drawing Sheets

(51) Int. Cl.
*G02B 26/12* (2006.01)
*A61B 3/00* (2006.01)
*G02B 27/01* (2006.01)
*H04N 5/64* (2006.01)
*G02B 27/22* (2018.01)

(52) U.S. Cl.
CPC .... *G02B 27/225* (2013.01); *G02B 2027/0134* (2013.01); *G02B 2027/0159* (2013.01); *G02B 2027/0178* (2013.01); *G02B 2027/0185* (2013.01); *H04N 5/64* (2013.01)

(58) Field of Classification Search
CPC ...... G02B 2027/0138; G02B 2027/014; G02B 2027/0159; G02B 2027/0178; G02B 27/01; G02B 27/0176; G02B 27/225
USPC .................................................. 359/619–633
See application file for complete search history.

(56) References Cited

FOREIGN PATENT DOCUMENTS

| | | |
|---|---|---|
| JP | 2014010326 A | 1/2014 |
| JP | 2014219621 A1 | 11/2014 |

OTHER PUBLICATIONS

International Preliminary Report on Patentability for corresponding PCT Application No. PCT/JP2015/076932, 13 pages, dated Jun. 29, 2017.
International Search Report for corresponding PCT Application No. PCT/JP2015/076932, 4 pages, dated Dec. 1, 2015.
Office Action for corresponding JP Application No. 2016-564708, 7 pages, dated Feb. 6, 2018.

\* cited by examiner

FIG.11
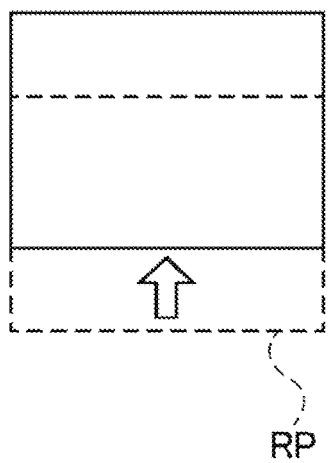 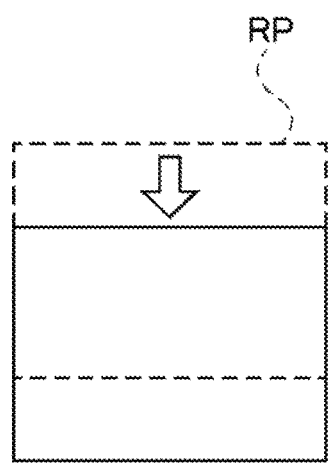
FIG.12
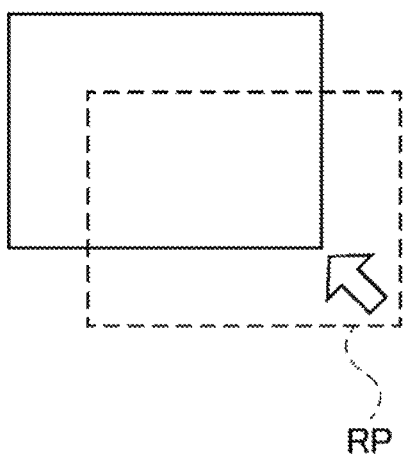 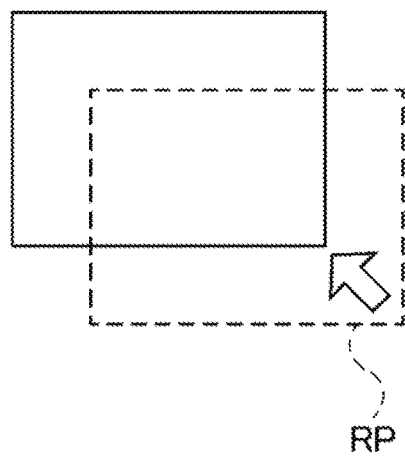

HEAD-MOUNTED DISPLAY DEVICE AND VIDEO DISPLAY SYSTEM

TECHNICAL FIELD

The present invention relates to a head-mounted display device worn on a user's head for use, a video display system that includes the head-mounted display device, a video provision device that provides a video to the head-mounted display device, a control program of the same, and an information storage medium.

BACKGROUND ART

A display device called, for example, head-mounted display or smart glasses (head-mounted display device) is known that is worn on a user's head for use. Such a display device allows the user to browse an image by forming the image in front of the user (refer, for example, to PTL 1).

CITATION LIST

Patent Literature

[PTL 1] JP 2014-10326 A

SUMMARY

Technical Problem

In the head-mounted display device described above, a distance from the user's eyes to the image forming position is determined by characteristics of built-in optics. The distance is not necessarily optimal depending, for example, on what is shown and user's eyesight.

The present invention has been devised in light of the foregoing, and it is an object of the present invention to provide a head-mounted display device capable of adjusting a distance to an image forming position, a video display system that includes the head-mounted display device, a video provision device that provides a video to the head-mounted display device, a control program of the same, and an information storage medium.

Solution to Problem

A head-mounted display device according to the present invention includes video display elements, optical elements, and a control mechanism. The video display elements show a video. The optical elements are arranged in front of user's eyes to cause the video shown by the video display elements to be incident on the user's eyes. The control mechanism changes an optical distance between the video display elements and the optical elements.

Also, a video display system according to the present invention is a video display system that includes a head-mounted display device and a video supply device. The head-mounted display device includes video display elements, optical elements, and a control mechanism. The video display elements show a video supplied from the video supply device. The optical elements are arranged in front of user's eyes to cause the video shown by the video display elements to be incident on the user's eyes. The control mechanism changes an optical distance between the video display elements and the optical elements. The video supply device includes a video supply section and an image forming distance control section. The video supply section supplies a video to the head-mounted display device. The image forming distance control section outputs a control instruction to change a distance from the optical elements to an image forming position of the video by operating the control mechanism.

Also, a video supply device according to the present invention is a video supply device that is connected to a head-mounted display device. The head-mounted display device includes a control mechanism that changes an optical distance between video display elements and optical elements. The video display elements show a video. The optical elements cause the video to be incident on user's eyes. The video supply device includes a video supply section and an image forming distance control section. The video supply section supplies a video to the head-mounted display device. The image forming distance control section outputs a control instruction to change a distance from the optical elements to an image forming position of the video by operating the control mechanism.

Also, a program according to the present invention is a program that causes a computer connected to a head-mounted display device to function as a video supply section and an image forming distance control section. The head-mounted display device includes a control mechanism that changes an optical distance between video display elements and optical elements. The video display elements show a video. The optical elements cause the video to be incident on user's eyes. The video supply section supplies a video to the head-mounted display device. The image forming distance control section outputs a control instruction to change a distance from the optical elements to an image forming position of the video by operating the control mechanism. This program may be stored in a computer-readable information storage medium.

BRIEF DESCRIPTION OF DRAWINGS

FIG. 11 is a diagram illustrating another example of adjustment control to adjust display positions of two videos in opposite directions.

FIG. 12 is a diagram illustrating an example of display position adjustment control to match with a direction of line of sight.

DESCRIPTION OF EMBODIMENT

A detailed description will be given below of an embodiment of the present invention with reference to drawings.

Figure 1:
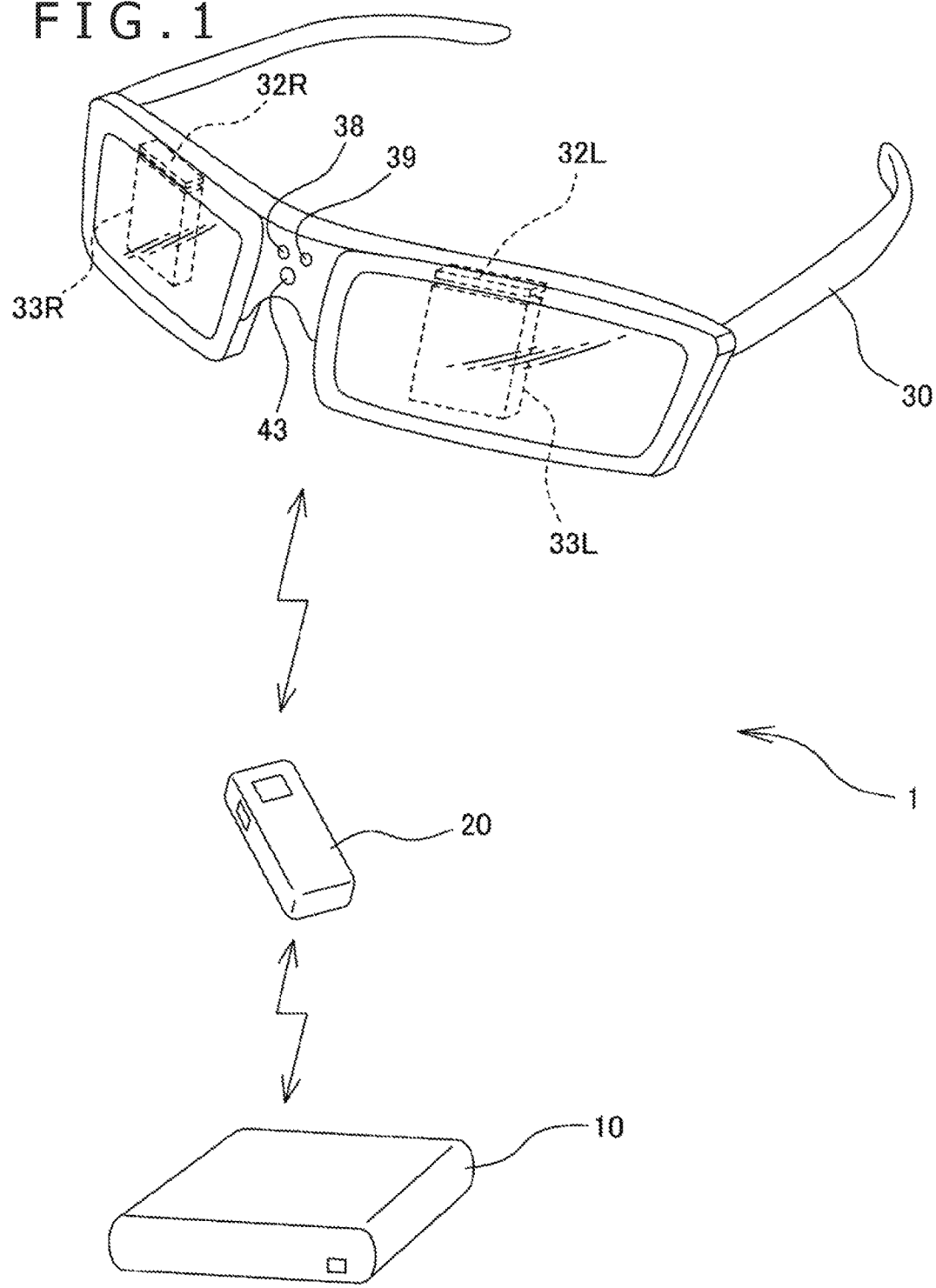
FIG. 1 is an overview diagram illustrating a configuration of a video display system according to an embodiment of the present invention.
Figure 2:
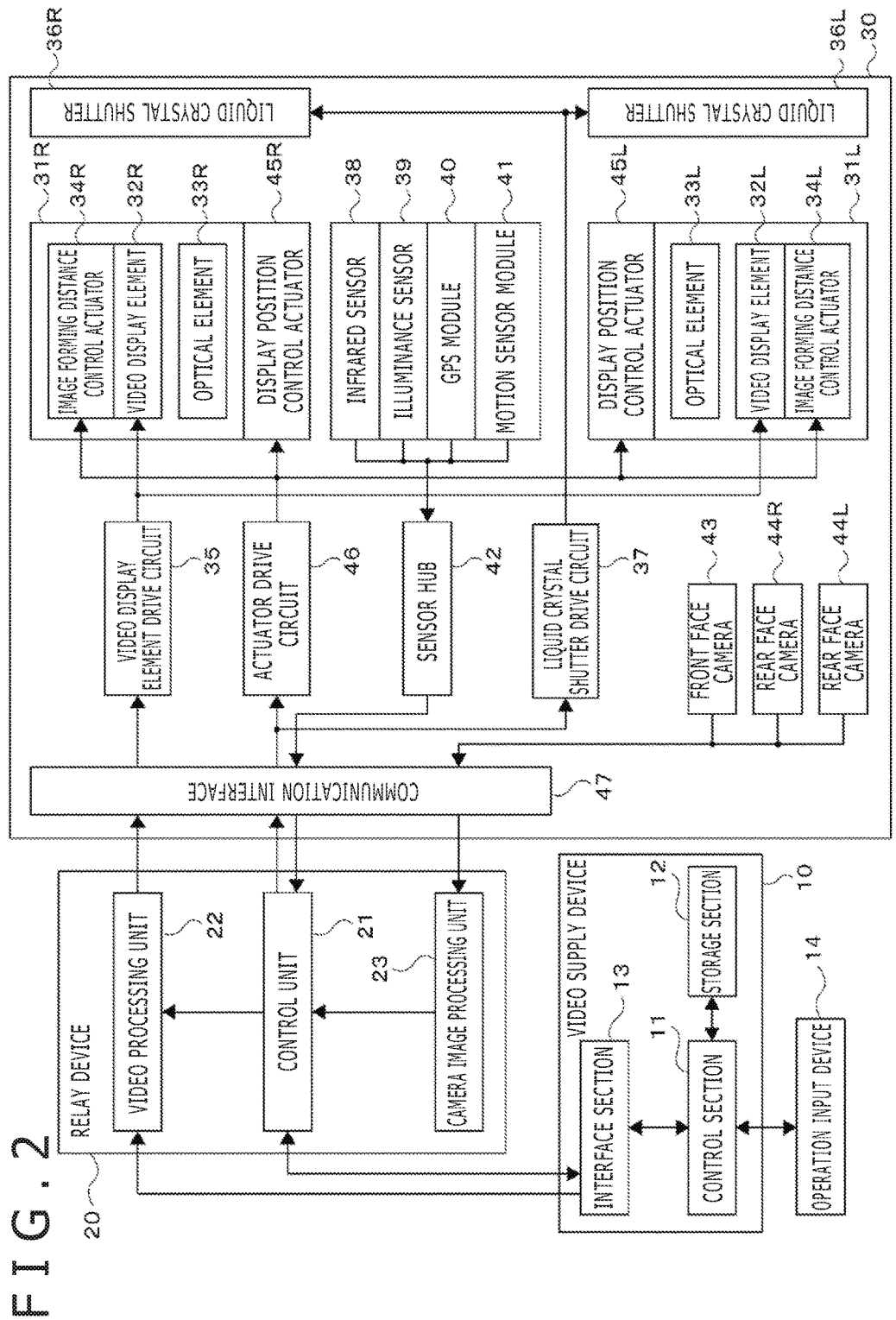
FIG. 2 is a configuration block diagram illustrating a configuration of the video display system according to the embodiment of the present invention.

FIG. 1 is an overview diagram illustrating a configuration of a video display system 1 according to an embodiment of the present invention. Also, FIG. 2 is a configuration block diagram illustrating a configuration of the video display system 1. As illustrated in these figures, the video display system 1 is configured to include a video supply device 10, a relay device 20, and a head-mounted display device 30.

The video supply device 10 is an information processing device that supplies a video to be shown by the head-mounted display device 30 and may be a home gaming device, a portable gaming device, a personal computer, a smartphone, a tablet, and so on. As illustrated in FIG. 2, the video supply device 10 is configured to include a control section 11, a storage section 12, and an interface section 13. Also, the video supply device 10 is connected to an operation input device 14.

The control section 11 is, for example, a central processing unit (CPU) and performs various information processing tasks by executing a program stored in the storage section 12. It should be noted that specific examples of processes performed by the control section 11 in the present embodiment will be described later. The storage section 12 includes memory devices such as random access memory (RAM) and stores the program executed by the control section 11 and data processed by the program. The operation input device 14 is a keyboard and mouse, a touch panel, a home gaming device controller, and so on and accepts operation input from a user.

The interface section 13 is an interface for data communication with the relay device 20. The video supply device 10 is connected to the relay device 20 via the interface section 13 in a wired or wireless manner. The interface section 13 may include a video communication interface such as high-definition multimedia interface (HDMI) (registered trademark) to send a video supplied by the video supply device 10 to the relay device 20. Also, the interface section 13 may include a data communication interface such as universal serial bus (USB) to receive various kinds of information from the head-mounted display device 30.

The relay device 20 accepts video data supplied from the video supply device 10 and outputs, to the head-mounted display device 30, a video signal that corresponds to accepted data. The relay device 20 is connected to the head-mounted display device 30 in a wired or wireless manner.

As illustrated in FIG. 2, the relay device 20 is configured to include a control unit 21, a video processing unit 22, and a camera image processing unit 23.

The control unit 21 is an integrated circuit that outputs various control signals for operating respective sections built in the head-mounted display device 30 in accordance with an instruction from the video supply device 10. Also, the control unit 21 receives, from the head-mounted display device 30, information measured by various sensors built in the head-mounted display device 30 and provides details of the information to the video supply device 10.

The video processing unit 22 is a video processor that converts video data supplied by the video supply device 10 into a video signal that can be shown on the head-mounted display device 30 and outputs the video signal. In particular, the video processing unit 22 generates a video signal for a right eye video and a video signal for a left eye video individually, based on the video data supplied by the video supply device 10 and outputs the video signals to the head-mounted display device 30. Here, if the video shown on the head-mounted display device 30 is a two-dimensional (2D) video, the video processing unit 22 outputs the same video signal as the right eye video and the left eye video. On the other hand, if a three-dimensional (3D) video (stereoscopic video) is shown on the head-mounted display device 30, it is necessary for the video processing unit 22 to output different video signals as the right eye video and the left eye video so that the user can stereoscopically recognize the video using parallax. Such two videos for stereoscopic browsing may be individually generated by the video supply device 10 and supplied to the video processing unit 22. Alternatively, two videos may be generated by the video processing unit 22 based on information provided from the video supply device 10. In the latter case, it is possible to allow the user to browse a stereoscopic video even if the video supply device 10 does not itself support stereoscopic browsing.

The camera image processing unit 23 receives camera images captured by a plurality of cameras (which will be described later) included in the head-mounted display device 30 and performs image processing on the received camera images as necessary. Processing results of the camera image processing unit 23 are output to the control unit 21.

The head-mounted display device 30 is a video display device worn on the head by the user for use, shows a video that corresponds to the video signal input from the relay device 20, and allows the user to browse the video. In the present embodiment, assume that the head-mounted display device 30 supports video browsing with both eyes and shows videos, one in front of the user's right eye and another in front of the user's left eye, independently of each other.

The head-mounted display device 30 is configured to include two video display units 31L and 31R, a video display element drive circuit 35, two liquid crystal shutters 36L and 36R, a liquid crystal shutter drive circuit 37, an infrared sensor 38, an illuminance sensor 39, a global positioning system (GPS) module 40, a motion sensor module 41, a sensor hub 42, a front face camera 43, two rear face cameras 44R and 44L, two display position control actuators 45L and 45R, an actuator drive circuit 46, and a communication interface 47.

The video display unit 31L shows a left eye video, and the video display unit 31R shows a right eye video. With the head-mounted display device 30 worn, the user browses the left eye video with the left eye and the right eye video with the right eye individually. The video display unit 31L includes a video display element 32L, an optical element 33L, and an image forming distance control actuator 34L, and the video display unit 31R includes a video display element 32R, an optical element 33R, and an image forming distance control actuator 34R.

The video display elements 32L and 32R are, for example, organic electroluminescence (EL) display panels and show videos individually, in accordance with a drive signal supplied from the video display element drive circuit 35, independently of each other. The video display element drive circuit 35 is an integrated circuit that outputs drive signals for driving the video display elements 32L and 32R based on the video signal input from the video processing unit 22 of the relay device 20. It should be noted that although the single video display element drive circuit 35 drives both the video display elements 32L and 32R here, the head-mounted display device 30 may include the two video display element drive circuits 35 for the two video display elements 32L and 32R. In this case, conventional circuits may be used as the respective video display element drive circuits 35.

The optical elements 33L and 33R are holograms, prisms, half mirrors and so on and are arranged in front of the user's eyes to refract video light shown by the video display elements 32L and 32R and cause the light to be incident on the user's eyes. More specifically, the optical element 33L is arranged below the video display element 32L, and when the head-mounted display device 30 is worn by the user, the optical element 33L is located in front of the user's left eye. The left eye video shown by the video display element 32L is guided by the optical element 33L to be incident on the user's left eye. Also, the optical element 33R is arranged below the video display element 32R, and when the head-mounted display device 30 is worn by the user, the optical element 33R is located in front of the user's right eye. The right eye video shown by the video display element 32R is guided by the optical element 33R to be incident on the user's right eye. Also, the optical elements 33L and 33R pass light incident from outside the head-mounted display device 30. Therefore, the user can simultaneously visually recognize what the outside world looks like and the videos shown by the video display elements 32L and 32R.

Figure 3:
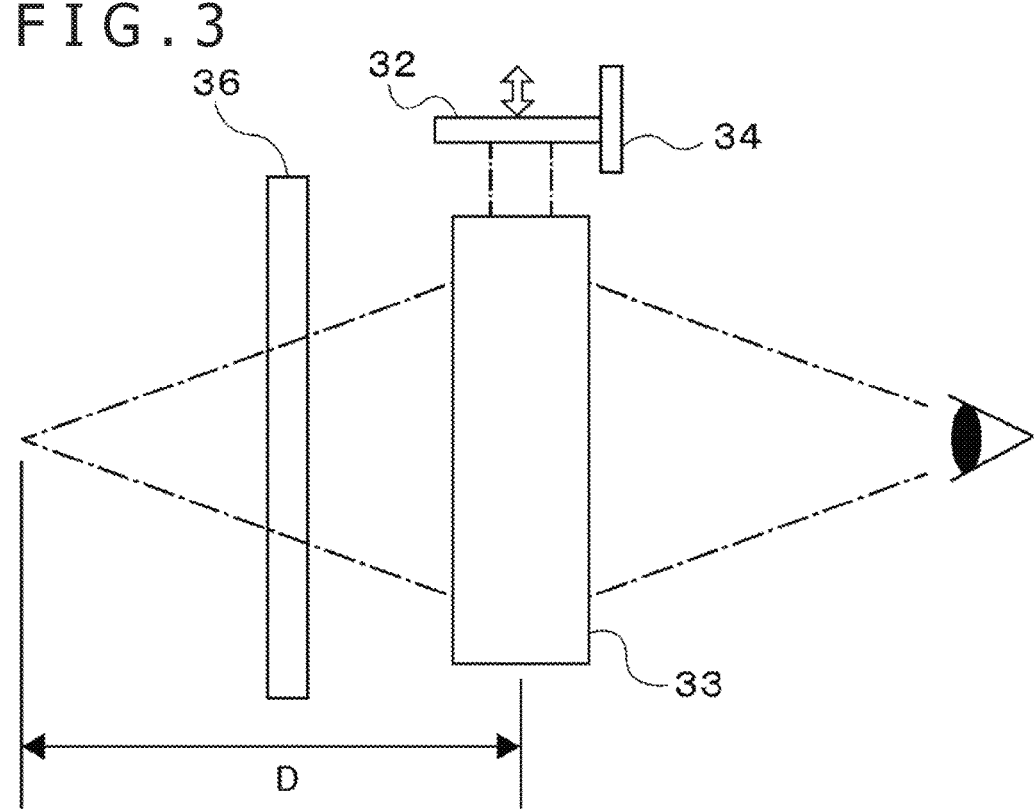
FIG. 3 is a diagram describing image forming distance adjustment control.

The image forming distance control actuators 34L and 34R are control mechanisms that change an optical distance between the video display element 32L and the optical element 33L and an optical distance between the video display element 32R and the optical element 33R and are realized, for example, by a drive mechanism such as impact-driven actuator, stepping motor, and conductive macromolecular polymer. Specifically, the image forming distance control actuator 34L moves the video display element 32L along the direction toward the optical element 33L. Thanks to control performed by the image forming distance control actuator 34L, a physical distance between the video display element 32L and the optical element 33L changes. Similarly, the image forming distance control actuator 34R moves the video display element 32R along the direction toward the optical element 33R. Thanks to this, a physical distance between the video display element 32R and the optical element 33R changes. When the distances between the video display elements 32 and the optical elements 33 change, the distance to the image forming position of the video as seen from the user's eyes changes. Hereinafter, the distance along the direction of the user's line of sight from the optical elements 33 to the image forming position of the video will be referred to as an image forming distance D. It is possible to adjust the image forming distance D of each of the left and right videos by controlling each of the image forming distance control actuators 34L and 34R. Here, a correlation between a travel distance of the video display elements 32 and the image forming distance D is determined in accordance with an optical design of the optical elements 33. FIG. 3 is a diagram for describing control for adjusting the image forming distance D and schematically illustrates a positional relationship between the video display elements 32, the optical elements 33, the liquid crystal shutters 36, and the user's eyes as seen from sideways. Also, the block arrows in the figure show a travel direction of the video display elements 32 by the image forming distance control actuators 34. It should be noted that specific examples of adjustment control of the image forming distance D will be described in detail later.

Figure 4:
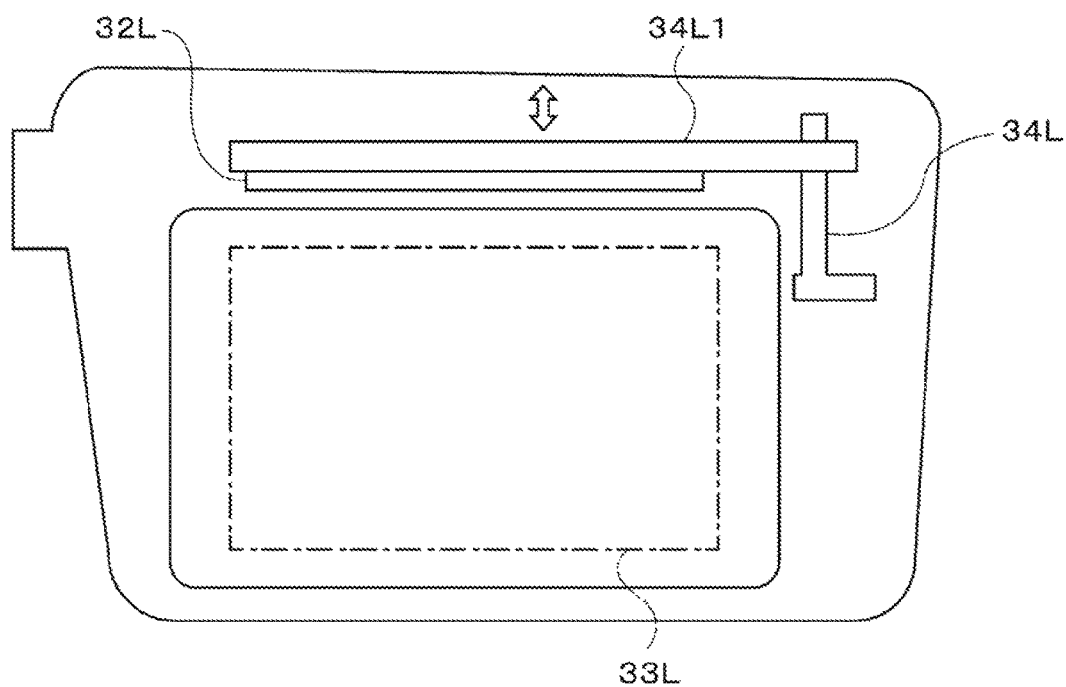
FIG. 4 is a diagram illustrating an implementation example of an image forming distance control actuator using an impact-driven actuator.

A description will be given here of several specific examples of the image forming distance control actuator 34. FIG. 4 schematically illustrates an implementation example of the image forming distance control actuator 34 using an impact-driven actuator. It should be noted that although this figure shows the configuration of only the image forming distance control actuator 34L that adjusts the image forming distance D of the left eye video, the image forming distance control actuator 34R may be implemented by similar components. In the example of this figure, the video display element 32L is fastened to a holder 34L1. Then, the image forming distance control actuator 34L is an impact-driven actuator, and a sliding shaft thereof penetrates one end of the holder 34L1. As the impact-driven actuator is driven, the holder 34L1 is moved up and down, allowing the distance between the video display element 32L and the optical element 33L to be changed. It should be noted that although, in the example of this figure, the video display element 32L is arranged at an upper portion of a frame surrounding the optical element 33L and the image forming distance control actuator 34L is arranged at a right side portion of the frame as one faces the frame, the present invention is not limited thereto, and the video display element 32L and the image forming distance control actuator 34L may be arranged at arbitrary positions around the optical element 33L.

Figure 5:
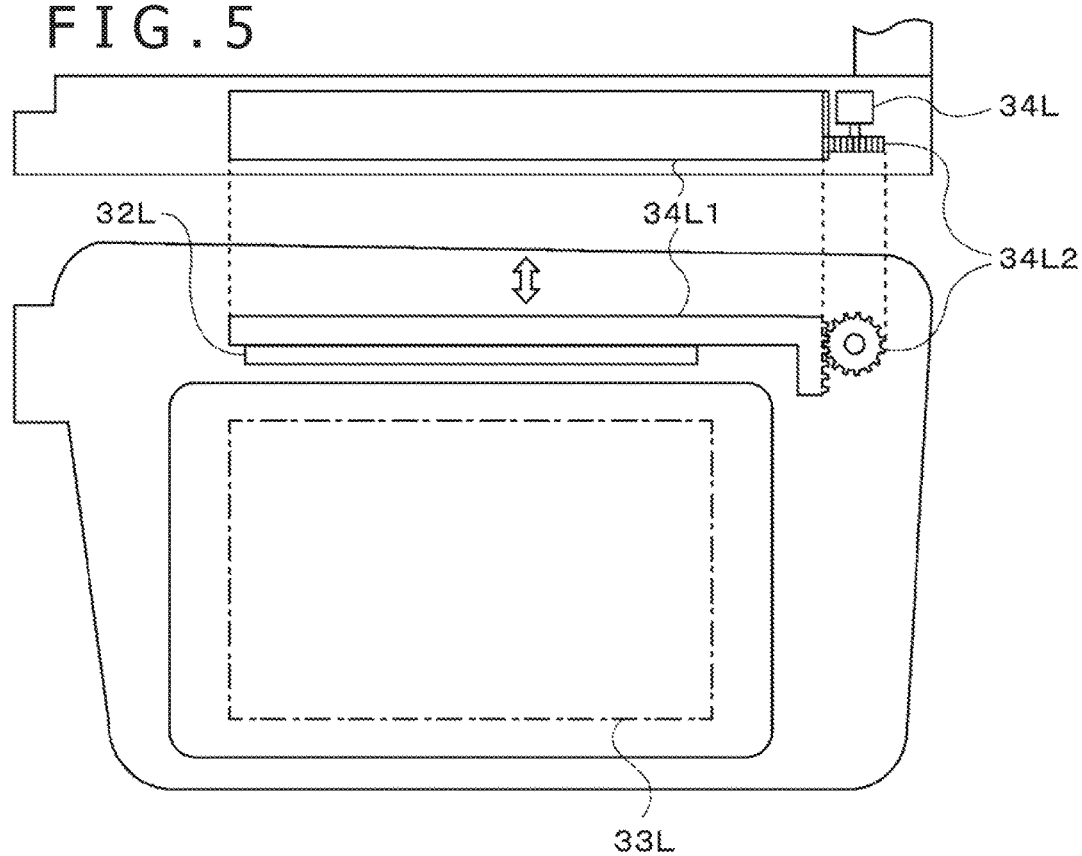
FIG. 5 is a diagram illustrating an implementation example of the image forming distance control actuator using a stepping motor.

A description will be given next of an implementation example of the image forming distance control actuator 34 using a stepping motor. If a stepping motor is used, the image forming distance control actuator 34 may be arranged at the side portion of the frame as in FIG. 4 so that the holder 34L1 is moved along the axial direction thereof. Also, the holder 34L1 may be moved in a direction intersecting the axial direction of the stepping motor via a gear 34L2. FIG. 5 illustrates an arrangement example in this case. The upper portion of this figure shows a plan view of a left side frame portion of the head-mounted display device 30, and the lower portion of the figure shows a front view of the left side frame portion of the head-mounted display device 30. In the example of this figure, the image forming distance control actuator 34L that is a stepping motor is arranged such that a rotating shaft thereof runs along the longitudinal direction of the head-mounted display device 30. The gear 34L2 is attached to that rotating shaft, and the gear 34L2 is in engagement with a groove provided on one end of the holder 34L1 that supports the video display element 32L. As a result, as the stepping motor is driven, the video display element 32L can be moved up and down.

Figure 6:
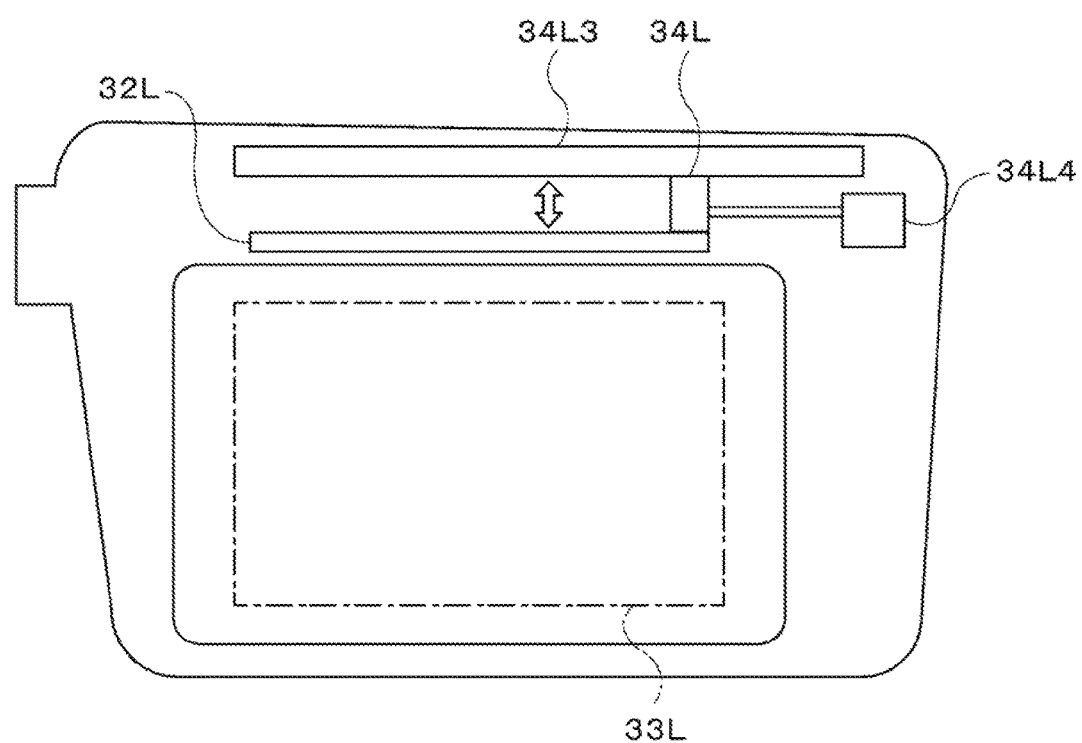
FIG. 6 is a diagram illustrating an implementation example of the image forming distance control actuator using a conductive macromolecular polymer.

A description will be given next of an implementation example of the image forming distance control actuator 34 using a conductive macromolecular polymer. FIG. 6 illustrates an arrangement example in this case. A conductive macromolecular polymer has a property to expand or contract in accordance with the voltage applied and can serve as an actuator thanks to this property. Specifically, in the example of FIG. 6, the image forming distance control actuator 34L that is a conductive macromolecular polymer is fastened to a base 34L3, and further the video display element 32L is fastened to the image forming distance control actuator 34L. It should be noted that assume here that the base 34L3 is fastened inside the frame such that the position thereof remains unchanged. Also, a signal output circuit 34L4 is connected to the image forming distance control actuator 34L, and the image forming distance control actuator 34L expands or contracts in accordance with a control signal output from the signal output circuit 34L4. As the video display element 32L moves up or down as a result of this expansion or contraction, the distance between the video display element 32L and the optical element 33L changes. It should be noted that the signal output circuit 34L4 may be realized as part of the actuator drive circuit 46 which will be described later.

The liquid crystal shutters 36L and 36R are light-transmitting elements that are arranged on the front face side of the optical elements 33L and 33R and used to change a light transmittance. Specifically, the liquid crystal shutter 36L is arranged to be opposed to the optical element 33L, and the liquid crystal shutter 36R is arranged to be opposed to the optical element 33R. When the user wears the head-mounted display device 30, external light passes through the liquid crystal shutter 36L and the optical element 33L in this order to be incident on the user's left eye. Also, external light passes through the liquid crystal shutter 36R and the optical element 33R in this order to be incident on the user's right eye. Assume here that if the liquid crystal shutters 36L and 36R are fully closed so that light does not pass therethrough, the user can no longer visually recognize what the outside world looks like, allowing the user to browse only the videos shown by the video display elements 32L and 32R. Each of the liquid crystal shutters 36L and 36R changes the light transmittance in accordance with a drive signal output from the liquid crystal shutter drive circuit 37. The liquid crystal shutter drive circuit 37 is an integrated circuit that operates each of the liquid crystal shutters 36L and 36R based on a control signal input from the control unit 21 of the relay device 20.

The infrared sensor 38 and the illuminance sensor 39 are arranged on the front face of the head-mounted display device 30 individually. The infrared sensor 38 detects an infrared signal and outputs the detection result thereof to the sensor hub 42. Also, the illuminance sensor 39 detects an illuminance of light around the head-mounted display device 30 and outputs the detection result to the sensor hub 42. It should be noted that we assume, in the present embodiment, that the illuminance sensor can detect not only just the illuminance of light in the outside world but also a color temperature thereof. The GPS module 40 identifies a current position of the head-mounted display device 30 by receiving a signal from a GPS satellite. That is, the GPS module 40 functions as a position detection sensor. The current position detection result of the GPS module 40 is output to the sensor hub 42.

The motion sensor module 41 measures various pieces of information about the position, orientation, and motion of the head-mounted display device 30. Specifically, in the present embodiment, assume that the motion sensor module 41 includes functions to serve as a triaxial acceleration sensor, a triaxial gyroscope, a triaxial geomagnetic sensor, and a barometric sensor and outputs a total of ten kinds of measurement results to the sensor hub 42. Using these measurement results, changes in the motion and orientation of the head-mounted display device 30 are identified. Specifically, using the detection result of the acceleration sensor, an inclination and a parallel travel of the head-mounted display device 30 relative to the vertical direction can be detected. Also, using a gyroscope or geomagnetic sensor, a rotary motion of the head-mounted display device 30 can be detected. Further, using a barometric sensor, a movement of the head-mounted display device 30 along the vertical direction can be detected.

The sensor hub 42 is an integrated circuit that integrates outputs of the infrared sensor 38, the illuminance sensor 39, the GPS module 40, and the motion sensor module 41 and outputs the integrated outputs to the control unit 21 of the relay device 20. The measurement results of these sensors are output asynchronously from each other as data in different formats. The sensor hub 42 combines these pieces of data in varying formats and outputs the combined data as serial data. This eliminates the need to secure a wide-band data communication network between the head-mounted display device 30 and the relay device 20 or make ready an interface that supports a plurality of kinds of data formats on the side of the relay device 20, allowing to efficiently send detection results of each of the sensors to the relay device 20.

The front face camera 43 is arranged on the front face of the head-mounted display device 30 and captures a scene in front of the user. On the other hand, the rear face cameras 44R and 44L are arranged where the rear face cameras 44R and 44L can capture the rear face side (user side) of the head-mounted display device 30 to capture the user's left eye and right eye. Images captured by these cameras are input to the camera image processing unit 23 of the relay device 20.

The display position control actuators 45L and 45R are drive mechanisms that adjust video display positions by moving the video display units 31L and 31R and may be realized by an impact-driven actuator, a stepping motor, a conductive macromolecular polymer, and so on as are the image forming distance control actuators 33L and 33R. Also, the display position control actuators 45L and 45R may be realized by a ball screw, a voice coil motor, a linear motor, and so on. In particular, the display position control actuators 45L and 45R can be realized by using a drive mechanism employed, for example, for camera autofocus and handshake correction. Specifically, the display position control actuator 45L moves the video display unit 31L as a whole that includes the video display element 32L and the optical element 33L in a plane that intersects the direction of the user's line of sight independently of the image forming distance control actuator 34L. In order to realize such movement control, the video display element 32L and the optical element 33L may be attached to a common support, and the display position control actuator 45L may move this support. Particularly in the present embodiment, the display position control actuator 45L is attached in such a manner as to be able to move the video display unit 31L both horizontally and vertically in a plane that is approximately orthogonal to the direction of the user's line of sight. Similarly, the display position control actuator 45R moves the video display unit 31R as a whole in a plane that intersects the direction of the user's line of sight. By controlling these display position control actuators 45, it is possible to adjust the video display position vertically and horizontally in a user's field of view. A specific example of this display position control will be described in detail later.

It should be noted that the display position control actuators 45L and 45R may move the video display units 31L and 31R not only in planes that intersect the direction of the user's line of sight but also along the user's line of sight. By moving the video display units 31L and 31R along the user's line of sight, the head-mounted display device 30 can adjust the distance from user's pupil positions to the video display elements 32L and 32R. This allows for so-called eye point adjustment that ensures that the user can properly view the video as a whole shown by the head-mounted display device 30.

Figure 7:
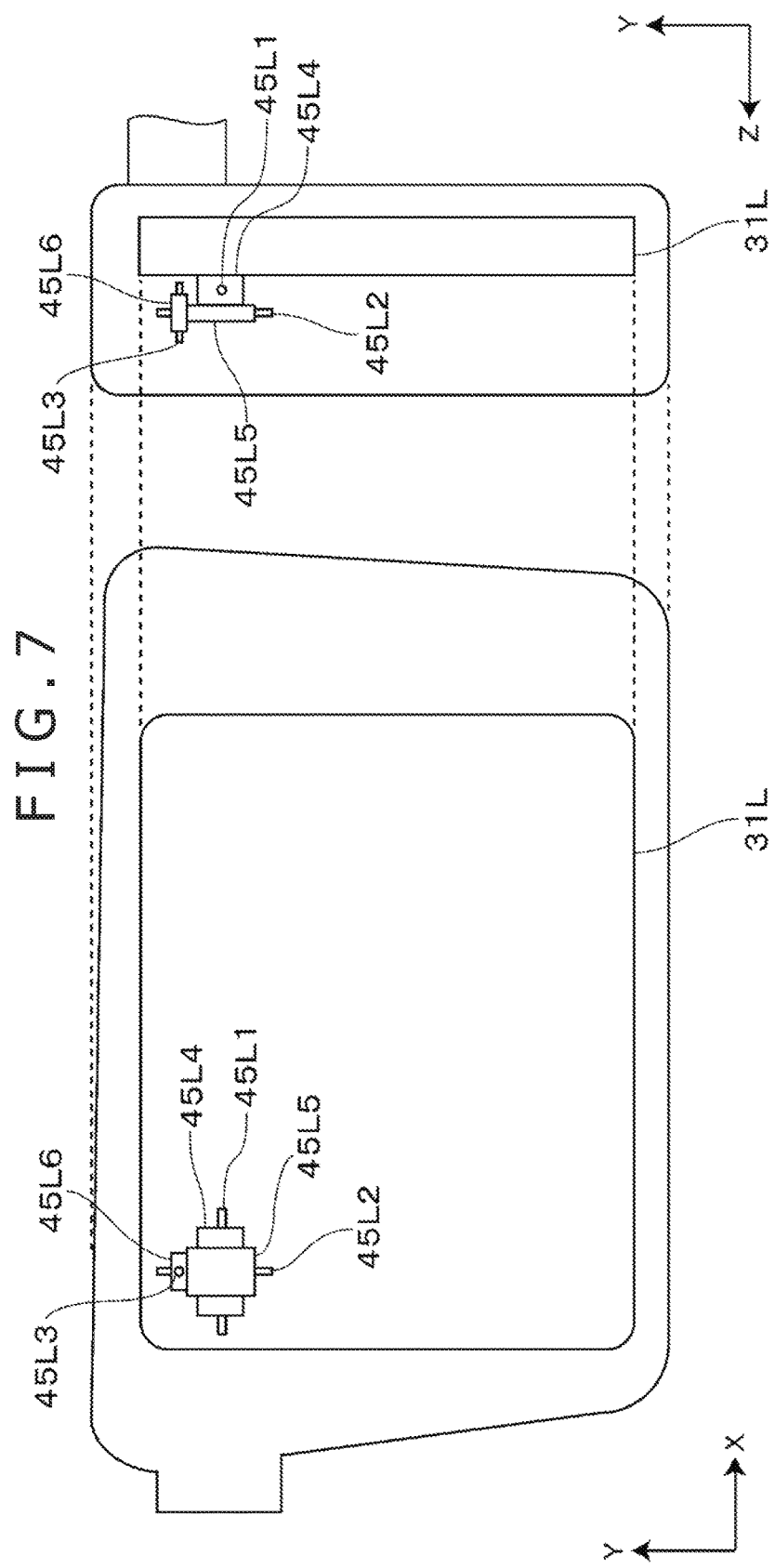
FIG. 7 is a diagram illustrating an implementation example of a display position control actuator using a ball screw.

A description will be given here of a specific implementation example of the display position control actuator 45. FIG. 7 schematically illustrates an arrangement example for realizing the display position control actuator 45 by using three ball screws in combination. A partial front view of the head-mounted display device 30 is shown on the left side as one faces the figure, and a partial right side view thereof is shown on the right side. It should be noted that although this figure illustrates only the components of the display position control actuator 45L that adjusts the display position of the left eye video, the display position control actuator 45R may be implemented by similar components. In the same figure, three threaded shafts 45L1, 45L2, and 45L3, are arranged inside a housing of the head-mounted display device 30, and each of the threaded shafts 45L1, 45L2, and 45L3 is driven by a motor to rotate. Then, as these threaded shafts rotate, stages 45L4, 45L5, and 45L6 associated with the respective threaded shafts move linearly along axial directions of the threaded shafts. Each of the stage 45L4, the stage 45L5, and the stage 45L6 is fastened to the video display unit 31L and is arranged such that the video display unit 31L moves in coordination with these stages. More specifically, the stage 45L4 moves along a horizontal direction (x-axis direction in the figure) in response to the rotation of the threaded shaft 45L1. Also, the stage 45L5 moves along a vertical direction (y-axis direction in the figure) in response to the rotation of the threaded shaft 45L2. Further, the stage 45L6 moves along a longitudinal direction (z-axis direction in the figure) in response to the rotation of the threaded shaft 45L3. This allows the head-mounted display device 30 to move the video display unit 31L to a given extent in an arbitrary direction, either longitudinally, horizontally, or vertically.

The actuator drive circuit 46 is an integrated circuit that outputs a drive signal to operate each of the image forming distance control actuators 34L and 34R, and the display position control actuators 45L and 45R based on a control signal accepted from the control unit 21 of the relay device 20.

The communication interface 47 is an interface to handle data communication with the relay device 20. For example, if the head-mounted display device 30 sends and receives data to and from the relay device 20 through wireless communication such as wireless local area network (LAN) or Bluetooth (registered trademark), the communication interface 47 includes a communication antenna and a communication module.

Figure 8:
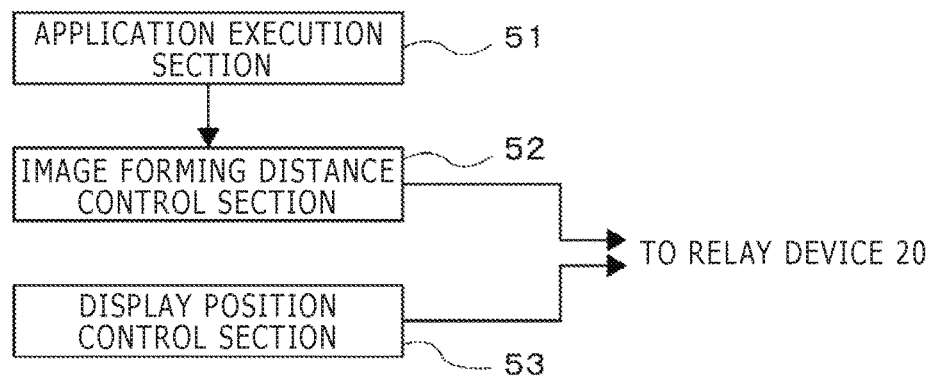
FIG. 8 is a functional block diagram illustrating functions of a video supply device.

A description will be given next of functions realized by the video supply device 10 using FIG. 8. As illustrated in FIG. 8, the video supply device 10 functionally includes an application execution section 51, an image forming distance control section 52, and a display position control section 53. These functions are realized as a result of execution of the program stored in the storage section 12 by the control section 11. This program may be provided to the video supply device 10 via a communication network such as the Internet or may be stored in a computer-readable information storage medium such as optical disc and provided.

The application execution section 51 provides services of an application program to the user as a result of execution of the application program by the control section 11. As a specific example, the application execution section 51 may provide services of a game to the user by executing the game program. Also, the application execution section 51 may play video data stored in an information storage medium by executing the video play program and present the video data to the user. In either case, the application execution section 51 generates a video to be presented to the user and supplies the generated video to the head-mounted display device 30 via the relay device 20.

The image forming distance control section 52 outputs an instruction to change the image forming distance D to the control unit 21 of the relay device 20. In response to the change instruction, the control unit 21 outputs control signals of the image forming distance control actuators 34L and 34R, changing the image forming distance D of the video on the head-mounted display device 30.

Particularly in the present embodiment, the image forming distance control section 52 sends an instruction to change the image forming distance D to the relay device 20 in response to an instruction from the application execution section 51. In the see-through head-mounted display device 30, there is a case in which the user may view the video shown and an object that actually exists in the outside world at the same time. Therefore, it becomes easier for the user to browse the video if the video image is formed at a distance close to the distance to the object that is simultaneously viewed. For this reason, the image forming distance control section 52 performs control such that the image forming distance D changes in accordance with the type of the application program under execution by the application execution section 51. This allows the video image to be formed at a distance suitable for details of the application program under execution.

As a specific example, assume that the application execution section 51 executes a plurality of types of application programs and that each of the application programs includes a distance specification parameter. The application execution section 51 outputs a value of the image forming distance D that corresponds to the distance specification parameter included in the application program under execution to the image forming distance control section 52, and the image forming distance control section 52 outputs a change instruction to change the image forming distance D to the input value. For example, if the application program is a navigation program that provides road guidance, and if information such as direction of travel is shown on the head-mounted display device 30 as a video, it is probable that the video shown is browsed together with an outdoor scene. In this case, the image forming distance D of the video is set to a large value (e.g., infinity). Also, if the application program is a program that shows cooking recipes, it is probable that the user browses information shown together with cooking ingredients and kitchenware located relatively nearby. In this case, the image forming distance D of the video is set to a small value. By changing the image forming distance D for each application program executed as described above, it is possible for the user to show a video at a desirable distance that corresponds to the scene in which the head-mounted display device 30 is used. Also, the application execution section 51 may output an instruction to change the image forming distance D corresponding to changes in details of the process even while the application program is executed.

Also, the image forming distance control section 52 may change the image forming distance D corresponding to the distance to the object present in front of the user. In this case, the head-mounted display device 30 includes a distance sensor that measures the distance to the object in front. The image forming distance control section 52 performs control so that such a measurement result of the distance sensor is acquired from the head-mounted display device 30 and that the image forming distance D is changed corresponding to the acquired measurement result. This allows for formation of a video image at a distance close to the distance to the detected object, thus forming, with high precision, a video image where it is easy for the user to visually recognize the video image together with the object.

Further, the image forming distance control section 52 may control the image forming distance D not only when the user browses a video together with what the outside world looks like but also when the user browses only a video with the liquid crystal shutters 36L and 36R closed. The distance at which it is easy for the user to view a video varies depending also on the user's eyesight and other factor. For this reason, the image forming distance control section 52 performs a calibration process that determines the image forming distance D at which it is easy for the user to view a video, for example, when the user uses the head-mounted display device 30 for the first time. Specifically, the image forming distance control section 52 closes the liquid crystal shutters 36L and 36R so that the user cannot view what the outside world looks like, and in this condition, the image forming distance control section 52 causes the user to browse a video by changing the image forming distance D little by little. While at the same time browsing the video, the user performs a given operation on the operation input device 14 when the user feels that the video is shown at the image forming distance D where it is easiest to view the video. The image forming distance control section 52 determines, as a reference image forming distance, the image forming distance D when this operation is accepted. Then, when the user is caused to browse a video thereafter, the image forming distance control section 52 issues an instruction such that a video image is formed at the reference image forming distance. This allows the user to browse the video at the image forming distance D where it is easy for the user to view the video. Also, by closing the liquid crystal shutters 36L and 36R when calibration is performed as described above, it is possible to determine the reference image forming distance in an environment where the user can readily concentrate on the video. It should be noted that when calibration is performed, the image forming distance control section 52 may automatically change the image forming distance D or gradually change the image forming distance D in accordance with an operation input to the operation input device 14 of the user.

Also, although, in the above description, the left image forming distance D and the right image forming distance D were adjusted in the same manner, the image forming distance control actuators 34L and 34R can adjust the positions of the video display elements 32L and 32R, respectively, independently of each other in the present embodiment. Therefore, the image forming distance control section 52 can specify different values as the image forming distance D for the left eye video and the image forming distance D for the right eye video. Therefore, the image forming distance control section 52 may determine the left and right reference image forming distances by performing, respectively, calibration of the image forming distance D for the left eye video and calibration of the image forming distance D for the right eye video one after another. Specifically, for example, the image forming distance control section 52 shows a video only on the video display element 32L with both the liquid crystal shutters 36L and 36R closed and determines the reference image forming distance for the left eye video by the same procedure as described above. Thereafter, the image forming distance control section 52 shows a video only on the video display element 32R and determines, this time, the reference image forming distance for the right eye video. By determining the left and right reference image forming distances independently as described above, calibration can be performed to provide the image forming distances D at which even the user with a difference in eyesight between the left eye and the right eye can readily view a video. It should be noted that if there is a large difference between the left image forming distance D and the right image forming distance D, the size of a video as seen from the user may be different between the left eye and the right eye. For this reason, the video processing unit 22 of the relay device 20 may increase or decrease at least one of the left eye video and the right eye video in accordance with the left image forming distance D and the right image forming distance D instructed from the image forming distance control section 52. This allows to ensure that the apparent sizes of the left video and the right video agree with each other.

Further, if the image forming distance D is changed in accordance with the type of the application program or details of the process, the application execution section 51 may specify the image forming distance D with a variation relative to the reference image forming distance rather than with an absolute value. In this case, the image forming distance control section 52 stores the reference image forming distance determined by calibration in the storage section 12. Then, if an instruction to change the image forming distance D is accepted from the application execution section 51, the reference image forming distance value changed in accordance with the variation included in the instruction is determined as a target image forming distance, and an instruction to change the image forming distance D to the determined target image forming distance is output to the relay device 20. This allows the image forming distance D to be changed as circumstances demand with reference to the image forming distance D that matches with the user's eyesight.

The display position control section 53 outputs an instruction to change the display position to the relay device 20. In response to this change instruction, the relay device 20 outputs control signals of the display position control actuators 45L and 45R, changing the video display position on the head-mounted display device 30. Particularly in the present embodiment, assume that the display position control section 53 moves the display position to match with the user's actual eye positions. In order to realize such control, the display position control section 53 acquires camera images captured by the rear face cameras 44R and 44L from the relay device 20 and identifies the user's eye positions in the fields of view of the rear face cameras 44R and 44L by analyzing the acquired camera images. Then, the display position control section 53 outputs an instruction to change the display position to the relay device 20 in accordance with the identified user's eye positions. This allows videos to be shown at positions close to the front of the user's eyes irrespective, for example, of the individual difference in the body shape of the user wearing the head-mounted display device 30 and the manner of wearing the head-mounted display device 30.

Figure 9:
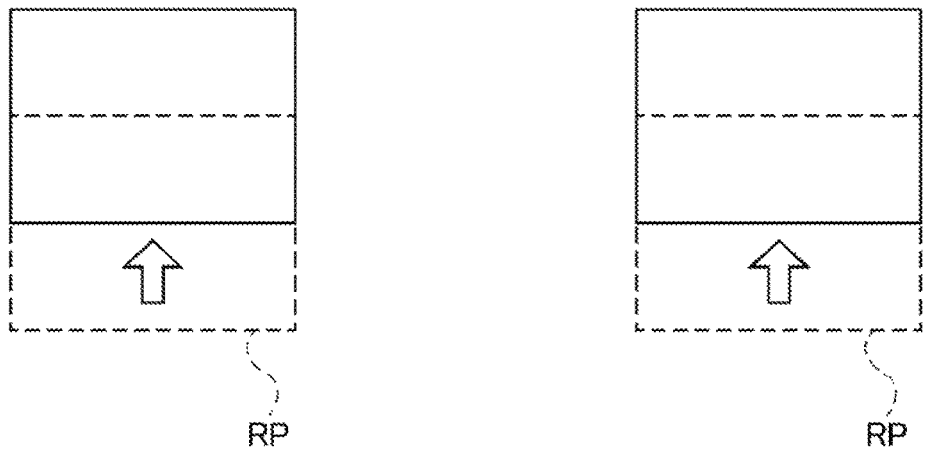
FIG. 9 is a diagram illustrating an example of adjustment control to adjust display positions of two videos in the same direction.

As a specific example, if the identified eye position is located in an upper portion of a range of a field of view of each rear face camera, it is probable that the user's eye position is located at a position higher than a standard position (or the user is wearing the head-mounted display device 30 at a lower position). In such a case, the display position control section 53 moves the video display position upward beyond a reference position RP by controlling the display position control actuators 45L and 45R and moving the video display units 31L and 31R upward. Here, the reference position RP refers to a position set in advance as a reference for showing a video and may be, for example, a display position of each of the left eye video and the right eye video when the video display units 31L and 31R are moved to centers of motion ranges by the display position control actuators 45L and 45R. FIG. 9 illustrates a case in which the display positions are moved upward above the reference position RP, and solid lines and dotted lines represent display positions of left video and right video and the reference position RP, respectively. Conversely, if it is probable that the user's eye position is located at a position lower than the standard position, it is only necessary for the display position control section 53 to output a change instruction to move the video display units 31L and 31R downward.

Figure 10:
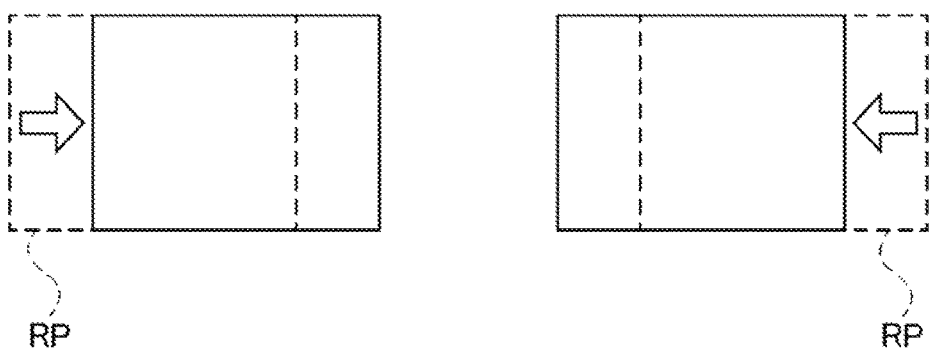
FIG. 10 is a diagram illustrating an example of adjustment control to adjust display positions of two videos in opposite directions.

Also, the display position control section 53 may move the video display unit 31L and the video display unit 31R in directions opposite to each other. For example, if a gap between the user's eyes is found to be narrower than a standard gap by the camera images of the rear face cameras 44R and 44L, the display position control section 53 brings the video display units 31L and 31R closer to each other by moving the video display unit 31L to the right as seen from the user and the video display unit 31R to the left as seen from the user, respectively. FIG. 10 illustrates a case in which the display position of the left eye image and the display position of the right eye image are brought closer to each other as described above. It should be noted that if, contrary to this, the gap between the user's eyes is found to be wider than the standard gap, the video display unit 31L and the video display unit 31R are moved away from each other.

Also, if, for example, the user wears the head-mounted display device 30 diagonally, one of the video display units 31L and 31R may be moved upward, and the other may be moved downward. FIG. 11 illustrates an example of the display positions when the video display unit 31L is moved upward and the video display unit 31R is moved downward.

Further, the display position control section 53 may identify not only the user's eye positions but also the direction of the user's line of sight and move the video display units 31L and 31R in accordance with the identification result thereof. The display position control section 53 can identify the direction of the user's line of sight from the images of the rear face camera 44R and the rear face camera 44L by using a known technology that identifies the direction of the user's line of sight from captured images of the user's eyes. In this example, the display position control section 53 moves the video display units 31L and 31R to match with the user's eye positions first. Then, if the user changes an orientation of the line of sight from forward to any one of upward, downward, leftward, or rightward, the display position control section 53 moves the video display units 31L and 31R to the direction of line of sight further from there. This allows the head-mounted display device 30 to adjust to changes in user's line of sight and show a video in the direction seen by the user. FIG. 12 illustrates an example of video display positions when the user's line of sight points in an upper left direction as the user faces the figure. By moving the video display positions to adjust to the direction of line of sight as described above, the user can feel as if the videos are shown over areas larger than sizes of the actual videos. Also, although the videos shown by the video display units 31L and 31R have only a small distortion near the center thereof, it is likely that the closer what is shown is to the periphery, the more distorted it may be. By moving the video display positions to match with the orientation of the user's line of sight as described here, it is possible to perform control such that the point on which the user's attention is focused is always located close to the center of the video. It should be noted, however, that if the display positions are moved from the reference position RP to match with the movement of the user's line of sight, the user will browse the videos from a diagonal direction rather than from the front, making it likely that the videos may be distorted due to that. For this reason, the video processing unit 22 of the relay device 20 may correct distortion of the videos shown in accordance with changes in the display positions.

Figure 13:
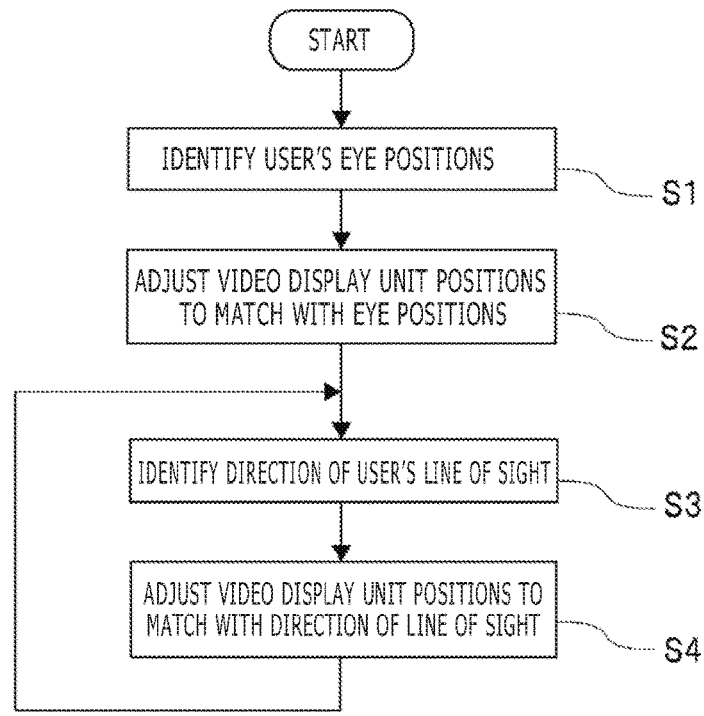
FIG. 13 is a flowchart illustrating an example of flow of display position adjustment control.

A description will be given here of a specific example of a control flow performed by the display position control section 53 described above using the flowchart of FIG. 13. When the user wears the head-mounted display device 30 and instructs the operation input device 14 to start using the head-mounted display device 30, the display position control section 53 acquires the images captured by the rear face cameras 44L and 44R by way of the relay device 20 and identifies the user's left and right eyes positions using the acquired images (S1). Then, the display position control section 53 outputs a control instruction to move the video display units 31L and 31R in accordance with the eye positions identified in S1 (S2). In response to this control instruction, the display position control actuators 45L and 45R move the video display units 31L and 31R, causing videos to be shown at positions close to the front of the user's eyes.

Thereafter, the display position control section 53 identifies the directions of line of sight of the left eye and the right eye of the user using the images of the rear face cameras 44L and 44R (S3). Then, the display position control section 53 outputs a control instruction to move the video display units 31L and 31R further to the positions that correspond to the directions identified in S3 (S4). In response to this control instruction, the display position control actuators 45L and 45R move the video display units 31L and 31R to the direction in which the user's line of sight points. This allows the head-mounted display device 30 to show videos ahead in the user's line of sight. The display position control section 53 repeats the processes in S3 and 34 while the user browses the videos shown by the head-mounted display device 30. This makes it possible to perform control such that the video display positions move to adjust to the movement of the user's line of sight.

A description will be given below of several specific examples realized by the video display system 1 according to the present embodiment.

The head-mounted display device 30 not only shows stereoscopic videos itself but also can be used as 3D glasses to browse stereoscopic videos shown by other stereoscopic video display device. In this case, the stereoscopic video display device shows stereoscopic videos by a frame sequential method. The head-mounted display device 30 receives, with the infrared sensor 38, a switching instruction signal sent through infrared rays by the stereoscopic video display device and outputs the received signal to the relay device 20. In response to the reception timing of this signal, the control unit 21 of the relay device 20 outputs a drive signal of the liquid crystal shutters 36L and 36R to the head-mounted display device 30. In response to this drive signal, the head-mounted display device 30 closes the liquid crystal shutter 36L when the stereoscopic video display device shows the right eye image and closes the liquid crystal shutter 36R when the stereoscopic video display device shows the left eye image. This allows the user to browse the stereoscopic video shown by the stereoscopic video display device.

Also, the head-mounted display device 30 can realize head tracking that detects the user's head motion with the built-in motion sensor module 41. While at the same time moving, for example, the position and orientation of a viewpoint arranged in a virtual three-dimensional space to match with this detected head motion, the application execution section 51 of the video supply device 10 generates videos representing what the inside of the virtual three-dimensional space looks like and supplies the videos to the head-mounted display device 30. This makes it possible to present, to the user, videos that change to match with the user's head motion.

Also, the relay device 20 may perform control to render videos easier to see to match with a light environment in the outside world by using a detection result of the illuminance sensor 39. For example, the control unit 21 of the relay device 20 adjusts the light transmittance of the liquid crystal shutters 36L and 36R in accordance with the illuminance value detected by the illuminance sensor 39. More specifically, if the surroundings of the head-mounted display device 30 are bright, it is possible to reduce glare caused by external light and render the videos easier to see by the user by reducing light transmittance by the liquid crystal shutters 36L and 36R. Also, the video processing unit 22 of the relay device 20 may perform a color conversion process that changes a color tone of the video to be shown in accordance with a color temperature of external light detected by the illuminance sensor 39. This makes it possible to show a video in easy-to-see colors when the video is browsed together with what the outside world looks like.

Also, the video supply device 10 may generate videos by using camera images captured by the front face camera 43 of the head-mounted display device 30. In this case, the application execution section 51 of the video supply device 10 generates a video to be shown on the head-mounted display device 30 by receiving a camera image of the front face camera 43 from the relay device 20 and superimposing other image on the received camera image. In particular, the application execution section 51 can generate a video that matches with a target by analyzing the camera image, extracting feature points of the target from the camera image, and superimposing the image at a position that corresponds to the extracted feature points.

Also, the head-mounted display device 30 includes a variety of sensors. Therefore, detection results of these sensors may be collected as user's behavior record and accumulated in the video supply device 10. In particular, by combining user's travel record collected by the GPS module 40 or the motion sensor module 41 with the camera image of the front face camera 43, it is possible to record the camera image together with the position where the camera image was captured.

Further, the group of these sensors may be configured to be attachable to and detachable from the head-mounted display device 30. Specifically, some or all of the infrared sensor 38, the illuminance sensor 39, the GPS module 40, the motion sensor module 41, the sensor hub 42, and the front face camera 43 are unitized and rendered attachable to and detachable from the head-mounted display device 30. Further, this sensor unit itself includes a wireless communication interface and can send acquired data to either the relay device 20 or the head-mounted display device 30. This allows the sensor unit capable of detecting a variety of information as part of the head-mounted display device 30 or allows the sensor unit to be attached to other object (e.g., autonomously moving toy, pet, and so on) to monitor the other object. Also in this case, because the sensor unit includes the sensor hub 42, it is possible to integrate detection results of a plurality of types of sensors and readily send the detection results to other devices.

Embodiments of the present invention are not limited to the one described above. For example, some of the processes such as outputting of a video signal described to be realized by the relay device 20 in the above description may be realized by the video supply device 10. Conversely, at least some of the processes described to be realized by the video supply device 10 in the above description may be realized by the relay device 20. Also, some of the processes described to be realized by the relay device 20 in the above description may be realized by integrated circuits built into the head-mounted display device 30. Further, if all the processes described to be realized by the relay device 20 in the above description are realized by the video supply device 10 and the head-mounted display device 30, the relay device 20 does not need to exist.

Also, although the head-mounted display device 30 was described to include the two video display units 31 in the above description, the head-mounted display device 30 may be a monocular display device that includes the single video display unit 31 used for browsing with one eye. Also, although the head-mounted display device 30 was described to be a see-through type that user can visually recognize the outside world in the above description, the head-mounted display device 30 may be a type that does not permit the outside world to be visually recognized. Even in these cases, the head-mounted display device 30 can cause a video to be browsed in a condition suitable for the user or for what is shown by adjusting the image forming distance D with the image forming distance control actuators 34 and changing the video display positions with the display position control actuators 45.

Figure 14:
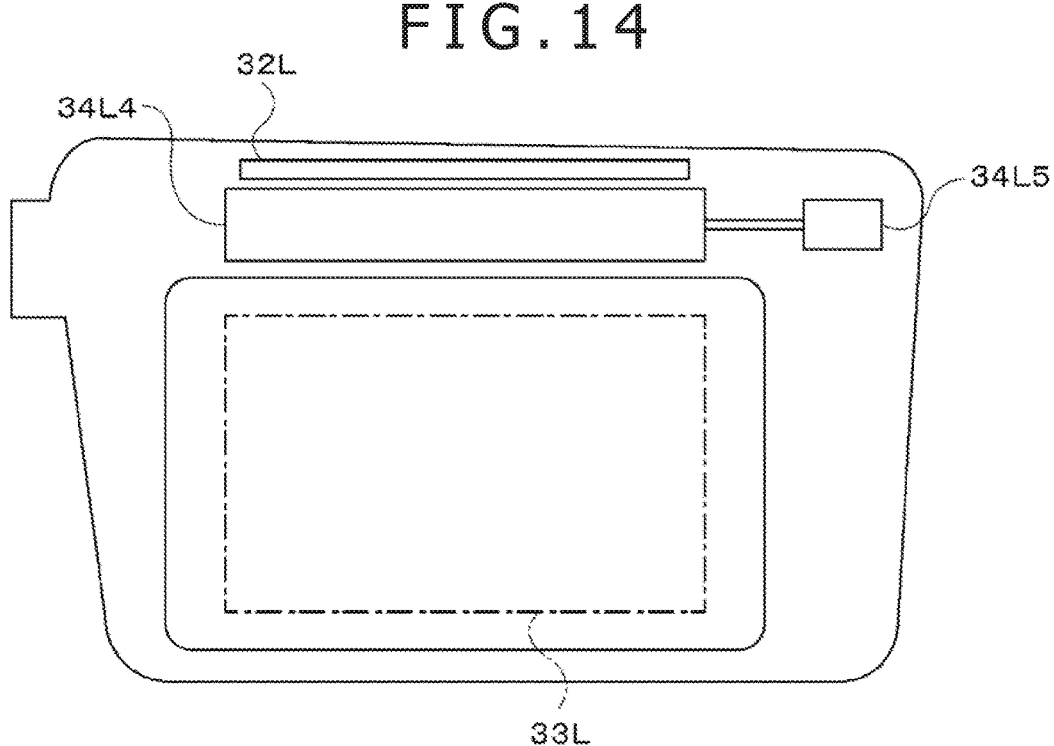
FIG. 14 is a diagram illustrating an implementation example of an image forming distance control mechanism using a refractive index adjustment element.

Also, although the image forming distance control actuators 34 were described to change optical distances between the video display elements 32 and the optical elements 33 in the above description by physically moving the video display elements 32, the image forming distance control actuators 34 may change the optical distances between the video display elements 32 and the optical elements 33 by moving the optical elements 33 rather than the video display elements 32. Also, the head-mounted display device 30 may change the optical distances between the video display elements 32 and the optical elements 33 by using image forming distance control mechanisms that change refractive indices of optical paths between the video display elements 32 and the optical elements 33 in place of the drive mechanisms that change the physical distances between the video display elements 32 and the optical elements 33. In this case, for example, the image forming distance control mechanisms are realized by liquid crystal lenses, liquid lenses, or other refractive index adjustment elements that are arranged between the video display elements 32 and the optical elements 33. FIG. 14 schematically illustrates an implementation example of such an image forming distance control mechanism. In the example of this figure, a refractive index adjustment element 34L5 is arranged between the video display element 32L and the optical element 33L. The refractive index adjustment element 34L5 is connected to a signal output circuit 34L6, and the refractive index of the refractive index adjustment element 34L5 changes in accordance with the control signal output from the signal output circuit 34L6. When the refractive index of the refractive index adjustment element 34L5 changes, the optical distance between the video display element 32L and the optical element 33L changes, causing the image forming distance D of the left eye video to change. According to the image forming distance control mechanism as described above, the image forming distance D can be controlled without physically moving the video display elements 32 and the optical elements 33. As a result, it is possible to avoid, for example, driving sound from being produced.

Figure 15:
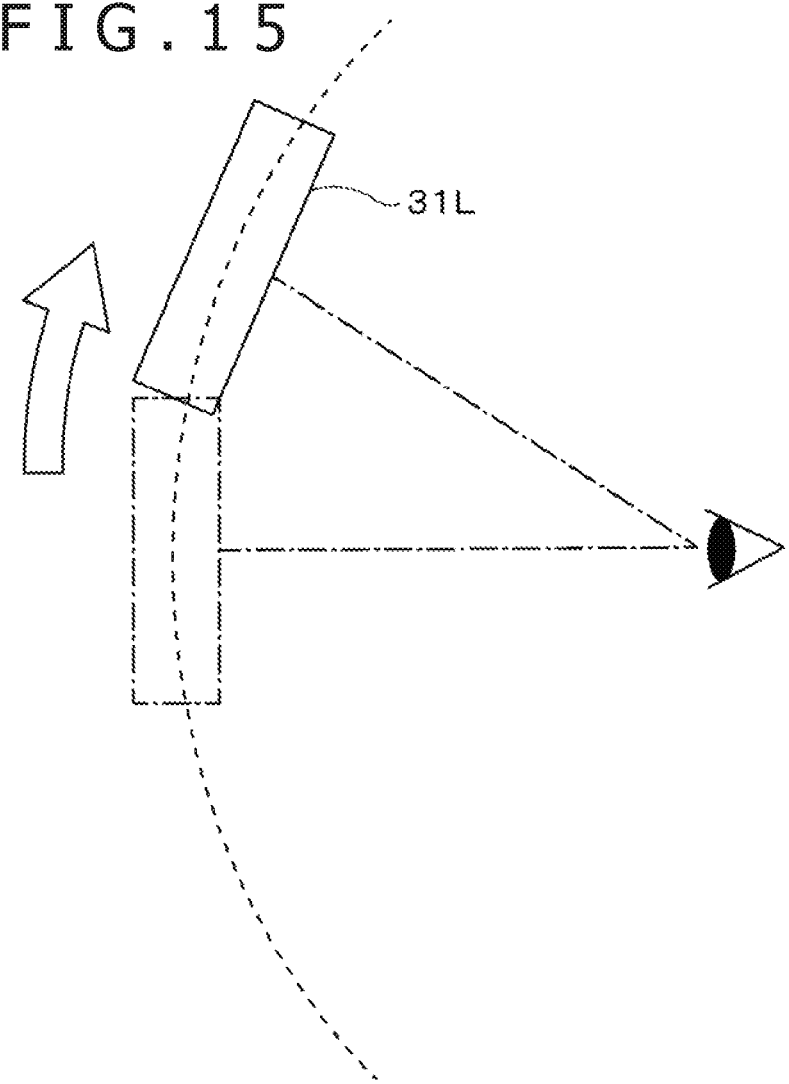
FIG. 15 is a diagram illustrating a modification example of a display position adjustment mechanism.

Also, the display position control actuators 45L and 45R were described in the above description to move the video display units 31L and 31R vertically and horizontally in parallel in a plane that is approximately orthogonal to the direction of the user's line of sight. In this case, the orientations of video display surfaces of the video display units 31L and 31R remain unchanged, and the video display surfaces are oriented in the same direction at all times. However, the display position control actuators 45L and 45R may move the video display units 31L and 31R, respectively, along a curved surface that intersects the direction of the user's line of sight. This curved surface should preferably be a convex curved surface on the opposite side of the user (front face side of the head-mounted display device 30) and have a shape close to a spherical surface centered at the user's eye position. If the video display units 31L and 31R are moved along such a curved surface, the orientations of the display surfaces also change with the movement of the video display units 31L and 31R. FIG. 15 is a diagram schematically illustrating an example of a movement path of the video display unit 31L when this kind of control is performed. This figure illustrates a positional relationship between the video display unit 31L and the user's left eye as seen from sideways. The dotted line in the figure represents the movement path along which the video display unit 31L moves as the video display unit 31L is driven by the display position control actuator 45L. As the display position control section 53 moves the video display unit 31L along such a movement path according to the direction of the user's line of sight, the video display unit 31L can be moved to be opposed to the user's line of sight both when the user's line of sight is directed upward and when the user's line of sight is directed downward, contributing to reduced video distortion as seen from the user. Similarly, when the display position control actuators 45L and 45R move the video display units 31L and 31R in the horizontal direction, the display position control actuators 45L and 45R may move the video display units 31L and 31R by rotating the video display units 31L and 31R to be opposed to the user's line of sight as much as possible. Such driving along a curved surface can be realized by a ball screw, a curved surface screw, a voice coil motor, a linear motor, and so on.

Further, the display position control actuators 45L and 45R may control the video display units 31L and 31R by combining the movement along a plane that intersects the direction of the user's line of sight and the movement along a curved surface that intersects the direction of the user's line of sight. For example, if the video display units 31L and 31R are moved in accordance with the user's eye positions as in S2 of the example in FIG. 13, we assume that the display position control actuators 45L and 45R move the respective video display units 31 along a plane that faces the user's face (plane approximately orthogonal to the direction of the user's line of sight). On the other hand, if the video display units 31L and 31R are moved in accordance with the direction of the user's line of sight as in S4 of the example in FIG. 13, the respective video display units 31 are moved along a convex curved surface in the front direction of the user as illustrated in FIG. 15 to match with the rotation of the user's eyeballs. This allows for control over the positions of the respective display units 31 such that the display units 31 face the direction in which the user's eyes point at all times. It should be noted that, in any of the cases described above, the movement of the respective video display units 31 by the display position control actuators 45L and 45R takes place in the direction that intersects the direction of the user's line of sight.

Also, the planar video display elements 32L and 32R were described in the above description to show a video, and the optical elements 33L and 33R were described in the above description to cause light representing the video to be incident on the user's left eye and right eye. However, the head-mounted display device 30 is not limited to such a method and may be a device that presents videos to the user by a variety of methods. For example, the head-mounted display device 30 may be a retinal irradiation (retinal projection) device that projects a video directly to the user's retinas. In this case, for example, the video display elements 32L and 32R are realized by a laser that emits light, a micro electro mechanical systems (MEMS) mirror that scans the light, and so on. This light is guided to the user's eyes by the optical elements 33L and 33R such as half mirrors. By causing light scanned as described above to be incident on the user's eyes, it is possible to form images directly on the user's retinas. In this retinal irradiation display device, it is also possible to move the video position recognized by the user in an arbitrary direction, either vertically or horizontally, that intersects the direction of the user's line of sight by moving each of the video display unit 31L that includes the video display element 32L and the optical element 33L and the video display unit 31R that includes the video display element 32R and the optical element 33R. In particular, because a retinal irradiation device is required to accurately cause light to be incident to match with the user's eye positions and the direction of the user's line of sight, it is effective to control the display positions by using the display position control actuators 45L and 45R.

Further, the display position control actuator 45L was described to move the video display unit 31L as a whole that included the video display element 32L and the optical element 33L, and similarly, the display position control actuator 45R was described to move the video display element 32R and the optical element 33R in the description given so far. However, the respective display position control actuators 45 can change the video display position when videos are presented to the user's eyes if it is possible to move the optical elements 33L and 33R that eventually cause light according to the videos to be incident on the user's eyes in the direction that intersects the direction of the user's line of sight. For this reason, depending on the method by which videos are presented, each of the display position control actuators 45L and 45R may move only some components including the optical elements 33L and 33R instead of moving the video display units 31L and 31R as a whole.

REFERENCE SIGNS LIST

1 Video display system, 10 Video supply device, 11 Control section, 12 Storage section, 13 Interface section, 14 Operation input device, 20 Relay device, 21 Control unit, 22 Video processing unit, 23 Camera image processing unit, 30 Head-mounted display device, 31L and 31R Video display units, 32L and 32R Video display elements, 33L and 33R Optical elements, 34L and 34R Image forming distance control actuators, 35 Video display element drive circuit, 36L and 36R Liquid crystal shutters, 37 Liquid crystal shutter drive circuit, 38 Infrared sensor, 39 Illuminance sensor, 40 GPS module, 41 Motion sensor module, 42 Sensor hub, 43 Front face camera, 44L and 44R Rear face cameras, 45L and 45R Display position control actuators, 46 Actuator drive circuit, 47 Communication interface, 51 Application execution section, 52 Image forming distance control section, 53 Display position control section.

The invention claimed is:

1. A video display system comprising:
a head-mounted display device; and
a video supply device,
wherein the head-mounted display device includes
left and right glasses lenses, each located so that respective major surfaces thereof are in, and transverse to, respective lines of sight of respective left and right eyes of a user when the head mounted display device is worn by the user,
left and right video display elements, each adapted to project video supplied from the video supply device along respective left and right axes, which are transverse to the respective lines of sight of the respective left and right eyes of a user,
left and right optical elements, each located so that respective major surfaces thereof are in, and transverse to, the respective lines of sight of, and closer to the respective left and right eyes of the user as compared to the left and right glasses lenses, where the respective left and right video display elements are located adjacent to the respective left and right optical elements such that: (i) the respective left and right axes are transverse to the respective major surfaces of the respective left and right optical elements, (ii) the video propagates toward and into respective minor edge surfaces of the respective left and right optical elements, which are respective minor edge surfaces are directed transversely to the respective lines of sight of the respective left and right eyes of the user, and (iii) the video is incident on the user's eyes, and
a control mechanism adapted to change an optical distance between the respective left and right video display elements and the respective left and right optical elements along the respective left and right axes, and
wherein the video supply device includes
a video supply section adapted to supply a video to the head-mounted display device by executing an application program, and
an image forming distance control section adapted to output a control instruction to change a distance from the optical elements to an image forming position of the video in accordance with the type of the application program by operating the control mechanism.

2. The video display system of claim 1, wherein the image forming distance control section changes the distance to the image forming position to a distance that corresponds to a distance specification parameter included in the application program.

3. The video display system of claim 1, wherein
the head-mounted display device further includes light-transmitting elements arranged on a front face side of the optical elements and used to change a light transmittance, and
the image forming distance control section determines a reference distance to the image forming position by accepting a user instruction while at the same time changing the distance to the image forming position with no light passing through the light-transmitting elements.

4. A video supply device connected to a head-mounted display device, wherein the head-mounted display device includes: (a) left and right glasses lenses, each located so that respective major surfaces thereof are in, and transverse to, respective lines of sight of respective left and right eyes of a user when the head mounted display device is worn by the user; (b) left and right video display elements, each adapted to project video supplied from the video supply device along respective left and right axes, which are transverse to the respective lines of sight of the respective left and right eyes of a user; (c) left and right optical elements, each located so that respective major surfaces thereof are in, and transverse to, the respective lines of sight of, and closer to the respective left and right eyes of the user as compared to the left and right glasses lenses, where the respective left and right video display elements are located adjacent to the respective left and right optical elements such that: (i) the respective left and right axes are transverse to the respective major surfaces of the respective left and right optical elements, (ii) the video propagates toward and into respective minor edge surfaces of the respective left and right optical elements, which are respective minor edge surfaces are directed transversely to the respective lines of sight of the respective left and right eyes of the user, and (iii) the video is incident on the user's eyes; and (d) a control mechanism adapted to change an optical distance between the respective left and right video display elements and the respective left and right optical elements along the respective left and right axes, the video supply device comprising:
a video supply section adapted to supply a video to the head-mounted display device by executing an application program; and
an image forming distance control section adapted to output a control instruction to change a distance from the optical elements to an image forming position of the video in accordance with the type of the application program by operating the control mechanism.

5. A head-mounted display device connected to a video supply device that supplies a video by executing an application program, the head-mounted display device comprising:
left and right glasses lenses, each located so that respective major surfaces thereof are in, and transverse to, respective lines of sight of respective left and right eyes of a user when the head mounted display device is worn by the user;
left and right video display elements, each adapted to project video supplied from the video supply device along respective left and right axes, which are transverse to the respective lines of sight of the respective left and right eyes of a user;
left and right optical elements, each located so that respective major surfaces thereof are in, and transverse to, the respective lines of sight of, and closer to the respective left and right eyes of the user as compared to the left and right glasses lenses, where the respective left and right video display elements are located adjacent to the respective left and right optical elements such that: (i) the respective left and right axes are transverse to the respective major surfaces of the respective left and right optical elements, (ii) the video propagates toward and into respective minor edge surfaces of the respective left and right optical elements, which are respective minor edge surfaces are directed transversely to the respective lines of sight of the respective left and right eyes of the user, and (iii) the video is incident on the user's eyes; and a control mechanism adapted to change an optical distance between the respective left and right video display elements and the respective left and right optical elements along the respective left and right axes, wherein the video supply device includes:

a video supply section adapted to supply a video to the head-mounted display device by executing an application program, and an image forming distance control section adapted to output a control instruction to change a distance from the optical elements to an image forming position of the video in accordance with the type of the application program by operating the control mechanism.

6. The head-mounted display device of claim 5, further comprising:

light-transmitting elements arranged on a front face side of the optical elements to change a light transmittance, wherein the light-transmitting elements are controlled not to pass light when the video supply device determines a reference optical distance by accepting a user instruction while at the same time changing the optical distance.

\* \* \* \* \*